(12) United States Patent
Gum

(10) Patent No.: US 8,315,673 B2
(45) Date of Patent: Nov. 20, 2012

(54) USING A DISPLAY TO SELECT A TARGET OBJECT FOR COMMUNICATION

(75) Inventor: Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 12/685,923

(22) Filed: Jan. 12, 2010

(65) Prior Publication Data

US 2011/0170787 A1 Jul. 14, 2011

(51) Int. Cl.
*H04M 1/00* (2006.01)

(52) U.S. Cl. ............... 455/566; 455/456.3; 455/456.1; 455/414.2; 455/550.1; 701/200; 701/207; 701/208; 701/210; 701/211; 348/231.3; 348/207.1; 348/22.1; 702/94; 702/95; 702/150; 702/152; 702/153

(58) Field of Classification Search .................. 455/566, 455/456.3, 456.1, 414.2, 550.1; 701/200, 701/207, 208, 210, 211, 214; 702/94, 95, 702/150, 152, 153; 348/231.3, 207.1, 222.1; 382/103, 104, 106, 190, 229
See application file for complete search history.

(56) References Cited

U.S. PATENT DOCUMENTS

| | | | |
|---|---|---|---|
| 4,801,201 A | 1/1989 | Eichweber | |
| 2001/0044858 A1 | 11/2001 | Rekimoto | |
| 2004/0109154 A1 | 6/2004 | Wallace et al. | |
| 2004/0208372 A1* | 10/2004 | Boncyk et al. | 382/181 |
| 2005/0041112 A1 | 2/2005 | Stavely et al. | |
| 2005/0046706 A1* | 3/2005 | Sesek et al. | 348/231.3 |
| 2005/0063563 A1* | 3/2005 | Soliman | 382/104 |
| 2005/0131639 A1 | 6/2005 | Broussard et al. | |
| 2006/0256229 A1 | 11/2006 | Wernersson | |
| 2007/0009159 A1 | 1/2007 | Fan | |
| 2007/0162942 A1 | 7/2007 | Hamynen et al. | |
| 2007/0210932 A1* | 9/2007 | Koshiba et al. | 340/825.69 |
| 2007/0279521 A1 | 12/2007 | Cohen | |
| 2008/0147730 A1 | 6/2008 | Lee et al. | |
| 2008/0170755 A1 | 7/2008 | Nasser et al. | |
| 2008/0285009 A1 | 11/2008 | Slipchenko et al. | |
| 2008/0309916 A1 | 12/2008 | Mok | |
| 2009/0096875 A1 | 4/2009 | Yoshimaru et al. | |
| 2009/0233623 A1 | 9/2009 | Johnson | |
| 2009/0248300 A1 | 10/2009 | Dunko et al. | |
| 2011/0169947 A1* | 7/2011 | Gum et al. | 348/135 |
| 2012/0032977 A1* | 2/2012 | Kim et al. | 345/633 |

FOREIGN PATENT DOCUMENTS

| | | |
|---|---|---|
| EP | 1553507 A2 | 7/2005 |
| EP | 1734341 A1 | 12/2006 |
| WO | WO03041000 A1 | 5/2003 |

OTHER PUBLICATIONS

Gulden P., et al.: "Wireless local positioning," IEEE Microwave Magazine, IEEE Service Center Piscataway NJ, USA, vol. 4 (4), Dec 1, 2003, pp. 77-86, XP011107180.

(Continued)

*Primary Examiner* — Ajit Patel
*Assistant Examiner* — Khai M Nguyen
(74) *Attorney, Agent, or Firm* — Jennifer M. Pascua

(57) ABSTRACT

The subject matter disclosed herein relates to interacting with a target object using an imaging device of a handheld mobile device.

50 Claims, 7 Drawing Sheets

OTHER PUBLICATIONS

International Search Report and Written Opinion—PCT/US2011/021015, ISA/EPO—Jul. 6, 2011.

ROHS, "Real-World Interaction with Camera-Phones," In 2nd International Symposium on Ubiquitous Computing Systems (UCS 2004), 10 pages.

Tobias H Hollerer, et al., "Mobile Augmented Reality", [Online] Mar. 15, 2004, Telegeoinformatics: Location-Based Computing and Services, Taylor & Francis Books Ltd, pp. 1-39, XP007917274, Retrieved from the Internet: URL:http://www.cs.ucsb.edu/{hol1/pubs/hol1 erer-2004-tandf.pdf>.

* cited by examiner

USING A DISPLAY TO SELECT A TARGET OBJECT FOR COMMUNICATION

BACKGROUND

1. Field

The subject matter disclosed herein relates to interacting with a target object using an imaging device of a handheld mobile device.

2. Information

Handheld mobile devices such as a cell phone, a personal digital assistant (PDA), or the like continue to increase in popularity. Such devices, which may include a digital camera, may photograph an object to be viewed at a later time. An ability to determine information regarding an object in an image of such a photograph may be desirable.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
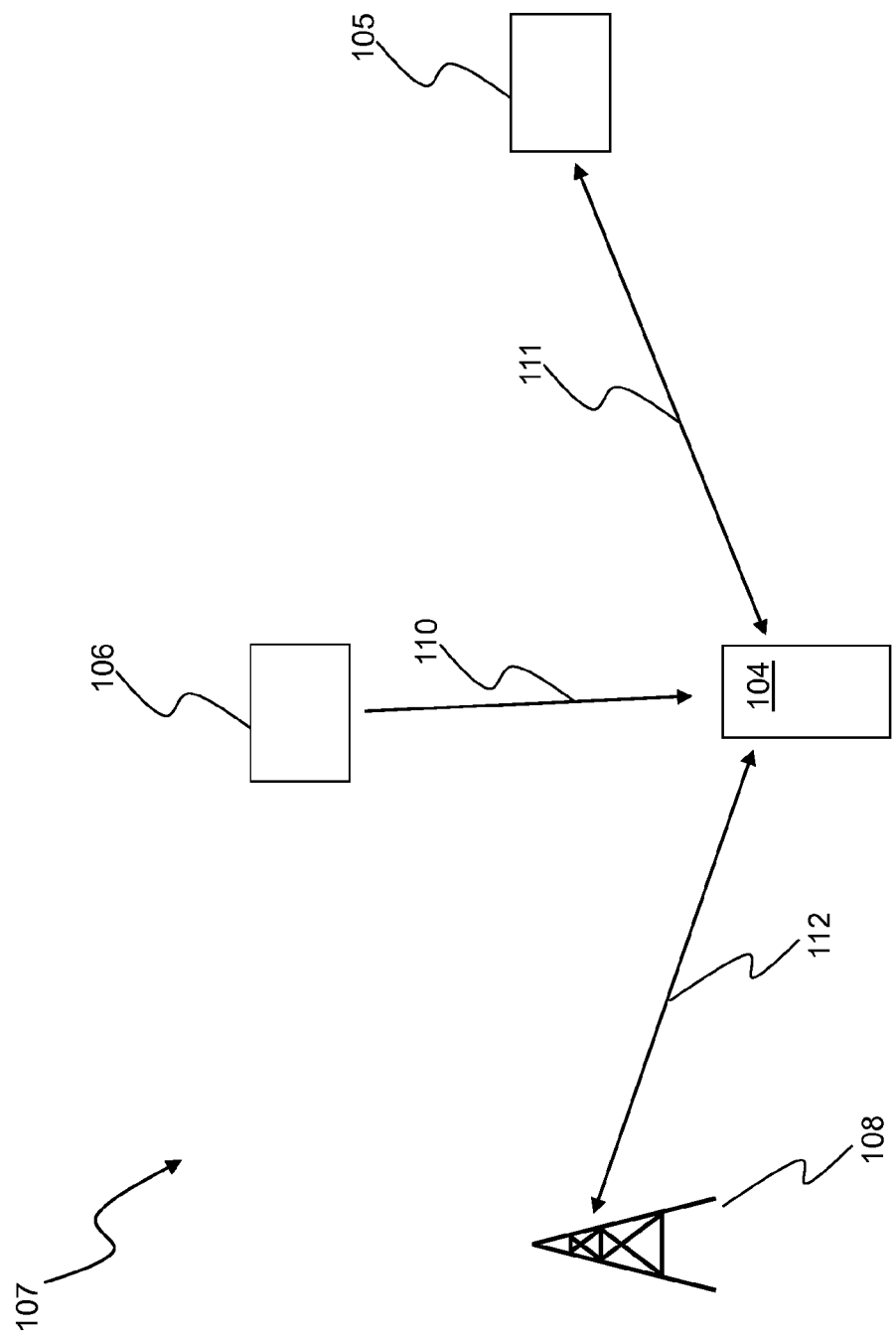
FIG. 1 shows a system of devices that may communicate with one another, according to an implementation.

In an implementation, a process may include capturing an image from a mobile device comprising object images of a plurality of target objects, displaying the captured image on a display device of the mobile device, receiving a selection of at least one of the target objects in the displayed captured image, and initiating communication with the selected target object responsive to the selection via the mobile device. It should be understood, however, that this is merely a particular example of processes and methods disclosed and discussed throughout, and that claimed subject matter is not limited to this particular example.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Implementations described herein include using a handheld mobile device (MD) to identify and subsequently communicate with a particular target object after selecting the particular target object in a display coupled to the MD. For example, such a display may show a captured image (e.g., a photograph) that includes several target objects such as a building, a statue, and electronic devices, just to name a few examples. Using such a display and a user interface of such an MD, a user may select a particular target object among several displayed target objects. Upon such a selection, an MD may go through a process of identifying and initiating communication with a selected target object, as described in detail below. In a particular implementation, such a selection of a particular target object may result in an MD acquiring information regarding the particular target object from a remote source if the MD does not already include such information (e.g., stored in a memory device). Such a remote source, such as a land-based base station for example, may also be used to identify a target object. Such a remote source may comprise a database that includes target object information produced and/or maintained by a service that determines which objects (e.g., target objects) may be of interest to users that subscribe to such a service, for example. Such information may comprise facts regarding a target object, history of a target object, price associated with a target object, availability of a target object, navigation directions regarding a target object, and/or information that may be used by a MD to initiate communication with a target object. At least a portion of such information may be shown in a display coupled to an MD.

In an implementation, such an MD may be used in various applications involving communicating with a target object comprising an electronic device. As described above, a user may select a particular target object among several displayed target objects. Designating a target object to communicate with may utilize information provided by the target device such as, but not limited to, a visual identification mark, bar code or numerical designator, visual indicator such as an indicator light or combination of indicator lights, a screen pattern, and/or identifying and characterizing information provided wirelessly by the target device. If such information is delivered wirelessly, wireless transmission from a target device may be initiated by a broadcast signal from an MD. Such a broadcast signal may include characteristic information of the target device such as device type. For example, a target device may comprise a television or a VCR. Wireless transmission may involve any one of a number of wireless technologies such as Bluetooth, WiFi, and/or other personal or local area networking technologies. In response to received identification information, a MD may associate a target device with the received identification information. For example, visual cues such as bar codes or numbers may be optically recognized and/or associated with a target device in order to lead to device identification. Similarly, wirelessly transmitted identification information associated with a target device may be either pre-assigned and/or generated randomly so as to be unique to a particular device in a particular circumstance. Identifying information may also include supported communications mode information. Once identification is determined, an MD may initiate directed communication with a target device, either using the same mode by which the identification information was delivered, or by using an other supported communication mode.

In the case of multiple identical devices, establishing directed communication with a particular target device may require a feedback step where communication is established with successive devices, each providing a detectable feedback signal such as a power on light or other device-specific, detectable change, in response to communication from the MD. The MD may then contact successive devices until the selected target device communication is achieved.

While the embodiments above correspond to visual and/or wireless techniques of communication, such implementations may also apply to similar audio techniques including, for example, using identifying frequency tones that may be detected by a MD to, at least partially, determine target device identifying information.

In an implementation, an MD may comprise a cell phone that may also function as a universal remote control to communicate with, and thus control, a number of electronic devices such as video/music devices, alarm systems, door locks, and interactive gaming devices, just to name a few examples. In another example, communication between an MD and a target object may involve authentication of a user of the MD to gain access to data files and/or other information stored remotely from the MD. Communication with a target object may also involve authentication procedures such as, for example, password entry and/or verification of credit/debit card information. Other examples include authentication and/or security procedures associated with financial transactions such as credit card purchases, equity transfers from one financial account to another, and so on. In a particular implementation, a target object may be associated with an item that a user desires to purchase. In such a case, upon identification of such an item, an MD may display information (which may have been stored in the MD and/or downloaded wirelessly from a server) regarding the item such as purchase price, availability, and so on. A user, choosing to purchase the item, may then enter credit card information, for example, which may be verified via communication with a target object associated with the purchase item. Of course, such applications are merely examples, and claimed subject matter is not so limited.

To describe a particular implementation, information regarding a target object may be acquired using an imaging device fixedly attached to or integrated with an MD. Such an imaging device may be positioned (aimed) to capture an image of one or more target objects. A display device of an MD may display such a captured image. A user may interact with a displayed captured image via a user interface such as a touch screen, keypad, stylus, and/or voice commands, just to name a few examples. During such an interaction, a user may select one or more target objects included in the displayed captured image. In one particular implementation, a user may select a particular target object included in a displayed captured image by selecting an associated label that overlay the target object in the image (e.g., selecting a location on a touch screen overlaid on the displayed captured image, positioning a cursor, and "clicking", etc.). A selected target object may then be identified by one or more various techniques that will be described in detail below. Upon such identification, an MD may acquire information regarding the selected target object, as indicated above. Such information may, for example, be used to initiate communication with the selected target object. For example, such information may describe a communication protocol and/or parameters that an MD may use to communicate with a target object.

As an example of such an implementation, a user may capture an image of a target object. In one particular implementation, such a target object may include an electronic device with which the user desires to communicate and/or interact. Such a user may aim a camera (e.g., included in a cellular phone) in a general direction toward the electronic device to capture an image of the electronic device. As another example, a user may similarly capture an image of a particular building about which the user desires information. In either example, such a captured image may include one or more target object candidates. In other words, a user may capture an image of multiple target objects purposely or inadvertently. For instance, the particular building in the example above may be located close enough to another building so that both buildings may be included in a captured image. Both buildings may be considered to be target objects, though a user may only be interested in one of the target objects in the image. Accordingly, a user may interact with a displayed captured image to select among such target objects of particular interest. For example, a user may use a touch screen display of a cellular phone to select an image of a particular electronic device among images of several devices included in a captured image. Subsequent to such a selection and identification of an electronic device, a user may communicate with the selected electronic device via an MD. Such an electronic device may include, just to name a few examples, access control such as an electronic door lock, a stereo, a television, a communication device, and/or other such electronic device in which a user may desire to control, interact with, and/or operate.

In one particular implementation, an identity of a target object, such as the particular building in the example above, may be determined from user input and/or image recognition techniques, just to name a few examples. Using such identification, a MD may acquire information regarding a target object wirelessly through a land-based base station and/or transceiver in response to a request for such information from the MD. In a particular implementation, such information may allow an MD to communicate with a target object, as mentioned above. Such information may be stored in a database maintained on a network in communication with the base station and/or transceiver, for example. In an alternative implementation, an MD may store such a database or a portion of such a database in memory on the MD. Such a database may comprise an image-keyed database, wherein information stored in the database may be organized and accessed based, at least in part, on visual attributes of one or more images associated with the information. Other database keys may also be combined to narrow the search field such as the location of the object. Such visual attributes may comprise location of an object in an image, type of object in an image, size of an object in an image and/or nearby or associated objects in an image, for example. To illustrate a particular implementation, an image of a target object may include a building that may have a substantially rectangular shape. Information associated with such an image may be stored or indexed in a database based, at least in part, on visual appearance or characteristics, such as a substantially rectangular shape, estimated number of floors or estimated height, for example. In one particular implementation, an image attribute may comprise view direction, wherein a view of a target object may be from a front of the target object versus from the rear of the target object. In another particular implementation, an image attribute may comprise image magnification and/or distance to a target object. An MD, for example, may determine such a distance using a number of techniques, including laser ranging or imaging. Of course, such details of acquiring and maintaining information regarding a target object are merely examples, and claimed subject matter is not so limited.

In an implementation, position information descriptive of a position of an MD may be provided to the MD by a user and/or determined using any one of several available positioning techniques. A list of such positioning techniques may include satellite positioning system (SPS), a Personal Area Network (PAN), a Local Area Network (LAN), a Wide Area Network (WAN), Ultra-wideband (UWB), AFLT, digital TV, a wireless repeater, RFID, a radio-location beacon, cell tower ID, and/or Bluetooth, just to name a few examples. Such position information may further enable an MD to identify a target object, for example, by narrowing a list of target object candidates during a search involving an image recognition process. For example, if an MD is located in a particular city while capturing an image including a target object, then it may be determined that such a target object is located in the particular city or at a particular location within the city. Accordingly, a search of candidate target objects may be limited to such target objects in the particular city or approximate locality. Such position information, such as cell tower ID, may provide less precise position information compared to other position information, such as SPS signals for example. Less precise position information, however, may be sufficient to narrow a search of candidate target objects. Of course, such details of acquiring position information are merely examples, and claimed subject matter is not so limited.

FIG. 1 shows a system 107 of devices that may communicate with one another, according to an implementation. In particular, an MD 104 may comprise any one of a variety of mobile receivers capable of receiving satellite navigation signals 110, transmitting/receiving wireless communication signals 112 to/from a base station 108, and/or transmitting/receiving wireless communication signals 111 to/from a target object 105. Signals 110, for example, may be transmitted from reference stations such as satellite vehicles (SVs) 106 and/or from terrestrial locations such as land-based beacons or base stations 108. MD 104 may comprise a mobile phone, a handheld navigation receiver, and/or a personal digital assistant (PDA), just to name a few examples. As mentioned above, MD 104 may employ any of several techniques to compute its position. In a particular implementation, such a positioning technique may be based, at least in part, on wireless signals 110 and/or wireless signals 112 received from satellites 106 and/or land-based base stations 108, respectively. In some implementations, MD 104 may integrate both an SPS receiver and a wireless communication device for voice and/or data communication. Thus, although the specific example of an SPS system may be described herein, such principles and techniques may be applicable to other satellite positioning systems or terrestrial positioning systems such as a wireless network.

As described above, subsequent to a user selecting a particular target object 105, communication between MD 104 and target object 105 may be initiated by MD 104. Via such communication, a user may wirelessly affect operation of target object 105 using MD 104. For example, target object 105 may comprise a sound system including a volume control that may be remotely and wirelessly adjusted using MD 104. Of course, such details of elements communicating with MD 104 are merely examples, and claimed subject matter is not so limited.

Figure 2:
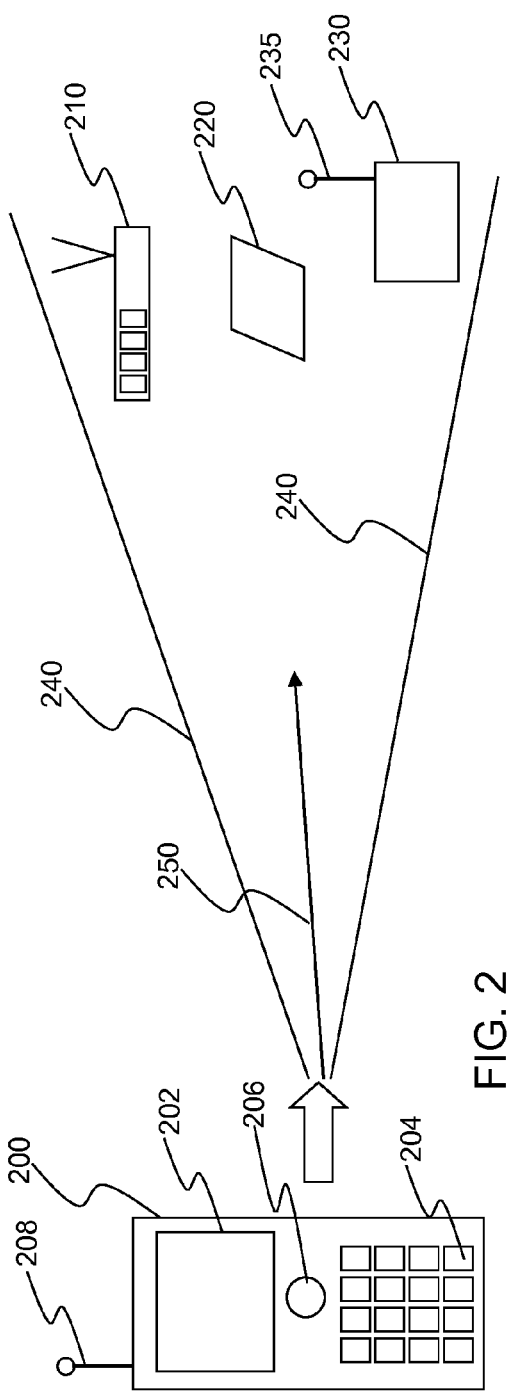
FIG. 2 is a schematic diagram showing an image capturing device directed toward target objects, according to an implementation.

FIG. 2 is a schematic diagram showing an MD 200 and target objects 210, 220, and/or 230, according to an implementation. Such target objects may comprise electronic devices, such as target object 230 shown with a communication antenna 235, for example. MD 200 may include an image capturing device 206, a display 202, a keypad 204, and/or an antenna 208. Such an image capturing device (e.g., a camera) may display a viewfinder image and/or a captured image in display 202. MD 200 may include a special purpose processor (FIG. 8) to host one or more applications, as described in greater detail below. MD 200 may include one or more user interfaces such as keypad 204 and/or a display 202, which may comprise a touch screen. Antenna 208 may comprise a portion of a transmitter/receiver (FIG. 8) used by MD 200 to transmit and/or receive various signals, such as from a positioning system, to/from a base station, or to/from a target object. In an application, MD 200, for example, may be directed or aimed so that a captured image is centered on any particular target object. Display 202 used as a viewfinder for image capturing device 200 may define an image boundary 240 and an image center line 250, which may assist a user in determining which portion of a scene is to be captured as an image. For example, multiple target objects 210, 220, and/or 230 may be included within an image boundary 240, and image capturing device 200 may be aimed so that target object 220 is centered in a captured image. Such target objects may comprise people, buildings, statues, lakes, mountains, landmarks, and/or electronic devices, just to name a few examples. Though such target objects may be captured in an image, not all target objects, such as people for example, may be identified by processes and/or techniques described herein. For example, a person may pose next to the Lincoln Memorial for a photo (a captured image). Such a monument may be identified, as described below, whereas the person, and other objects within a captured image, need not be identified. A process for identifying which target object is to be identified will be described in detail below. Alternately, a person or other personal object may be identified using a personal image database where an image of a selected object/person is compared to a database of images specific to the user.

Figure 3:
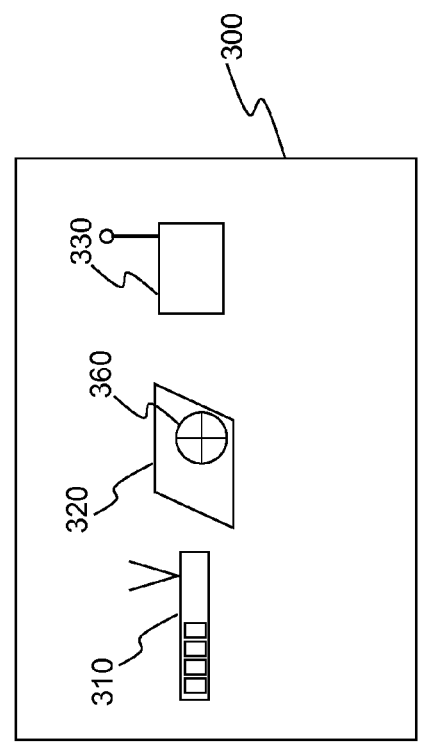
FIG. 3 is a schematic diagram representing a viewfinder image of an image capturing device directed toward target objects, according to an implementation.

FIG. 3 is a schematic diagram representing a viewfinder image 300 as captured by an image capturing device, such as image capturing device 200, directed toward target objects 310, 320, and 330, according to an implementation. As mentioned above, such a viewfinder image may be shown by display 202. Image boundary 240 may define edges of view finder image 300. Center line 250 may define image center 360, which may comprise cross-hairs, a circle, and/or other symbol or configuration that indicates an image center to a user, for example. Viewfinder image 300 may include photographic information (not shown) such as light level, shutter speed, number of photos taken, and so on. Of course, details of such a viewfinder image are merely examples, and claimed subject matter is not so limited.

Figure 4:
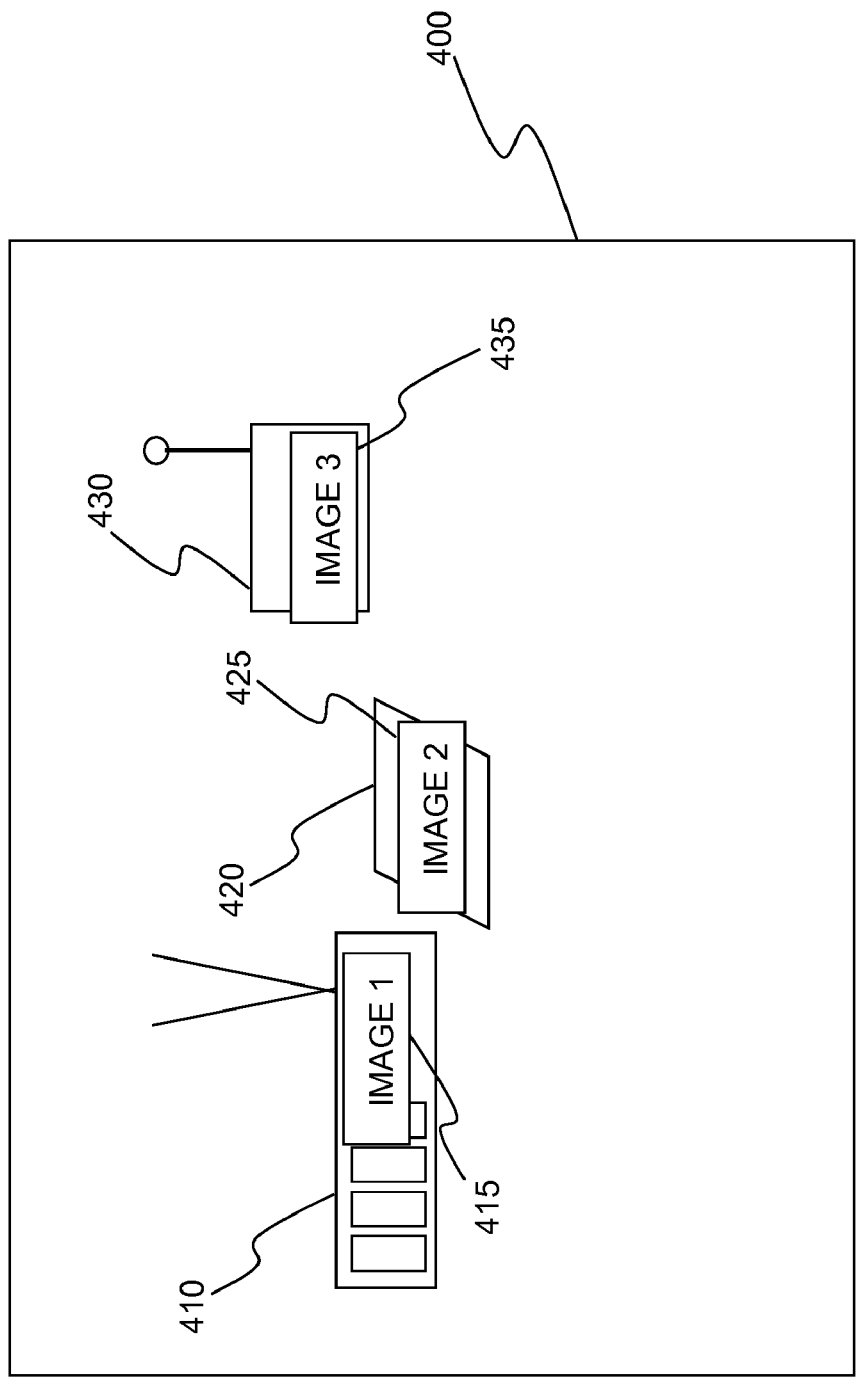
FIG. 4 is a schematic diagram representing a captured image that includes target objects, according to an implementation.

FIG. 4 is a schematic diagram representing a captured image 400 that includes target objects 410, 420, and 430, according to an implementation. Such target objects may be labeled, for example, by overlaid and/or superimposed labels 415, 425, and/or 435. For example, such labels may comprise semi-transparent numbers and/or letters superimposed on target objects. Such labeling may provide a way for a user to select a particular target object among a plurality of target objects. In one particular implementation, an MD may determine which target objects included in a captured image are identifiable, and thus place labels over such identified target objects. An MD may analyze a captured image using an image recognition technique to determine which portions of the captured image comprise a target object and which portions comprise merely background images. For example, a captured image may include three adjacent statues in a central region of a captured image, surrounded by background images. In such a case, image recognition techniques may be used to determine which portions of a captured image are target objects (e.g., the statues) and which portions are merely background imagery. If such target objects are successfully identified during such a process, then an MD may label such target objects, as described above. Using such labels to identify a target object, a user may select one or more labeled target objects via a keypad, touch screen, and/or voice commands, just to name a few examples. In another aspect, the ascertained identity and characteristics such as location of the targeted object may be used to label a picture of the target object.

In another implementation, in an absence of such labels, a user may select a particular target object via a pointing device, such as a mouse and/or touch pad, for example, to navigate an icon or symbol to a particular target object in a displayed captured image to select the particular target objects. For example, an MD may display a selection indicator symbol in a display device to indicate which target object among multiple target objects in the displayed captured image is currently selected. Such indication may comprise highlighting a current selection by brightening the selection compared to other portions of the captured image, displaying a frame around the selection, and/or increasing the image size of the selection, just to name a few examples. A user may toggle a position of a selection indicator to jump among target objects in the displayed captured image. For example, a user may press a key once for each selection jump from one target object to a next target object. A user may then select a target object in a displayed captured image based, at least in part, on a position of such a selection indicator.

Figure 5:
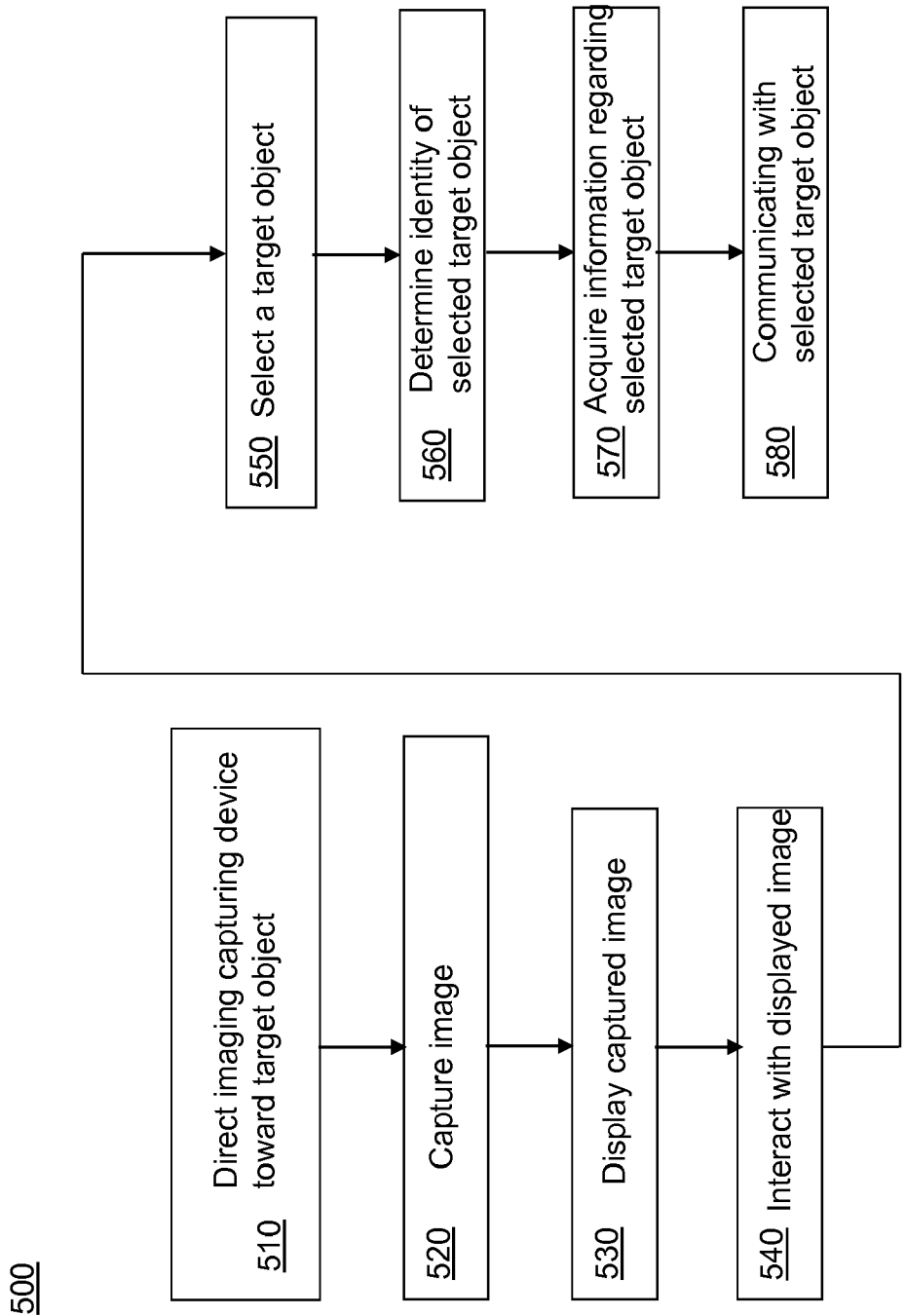
FIG. 5 is a flow diagram illustrating a process for acquiring information regarding a target object, according to an implementation.

FIG. 5 is a flow diagram of a process 500 for acquiring information regarding a target object and communicating with the target object, according to an implementation. At block 510, a user may direct an imaging capturing device, such as a camera included in a cell phone, toward a target object for which the user desires information or with which the user desires to communicate. A user may aim an image capturing device so that such a target object is at least approximately centered in a viewfinder image, as indicated by image center 360, for example. Alternatively, a user may select such a target object among multiple target objects subsequent to capturing an image, as at block 520. An image recognition process may be used, for example, to resolve a captured image into a plurality of target objects. One such image recognition process is described in Fan, U.S. Patent Application Publication No. US2007/0009159, for example. At block 530, such a captured image may be displayed in a display of an MD, for example. At block 540, a user may interact with such a displayed captured image via a user interface such as a touch screen, keypad, and/or voice commands, just to name a few examples. At block 550, during such an interaction, a user may select one or more target objects included in the displayed captured image. In one particular implementation, as mentioned above, a user may select a particular target object in a captured image by selecting an associated label that overlays the target object in the image. At block 560, a selected target object may then be identified by one or more various techniques including image recognition and/or user input, for example. Upon such identification, at block 570, an MD may acquire information regarding the selected target object. Such information may, for example, be used to initiate communication with the selected target object, as at block 580. Of course, such details of determining an identity of a target object and acquiring information regarding the target object are merely examples, and claimed subject matter is not so limited.

Figure 6:
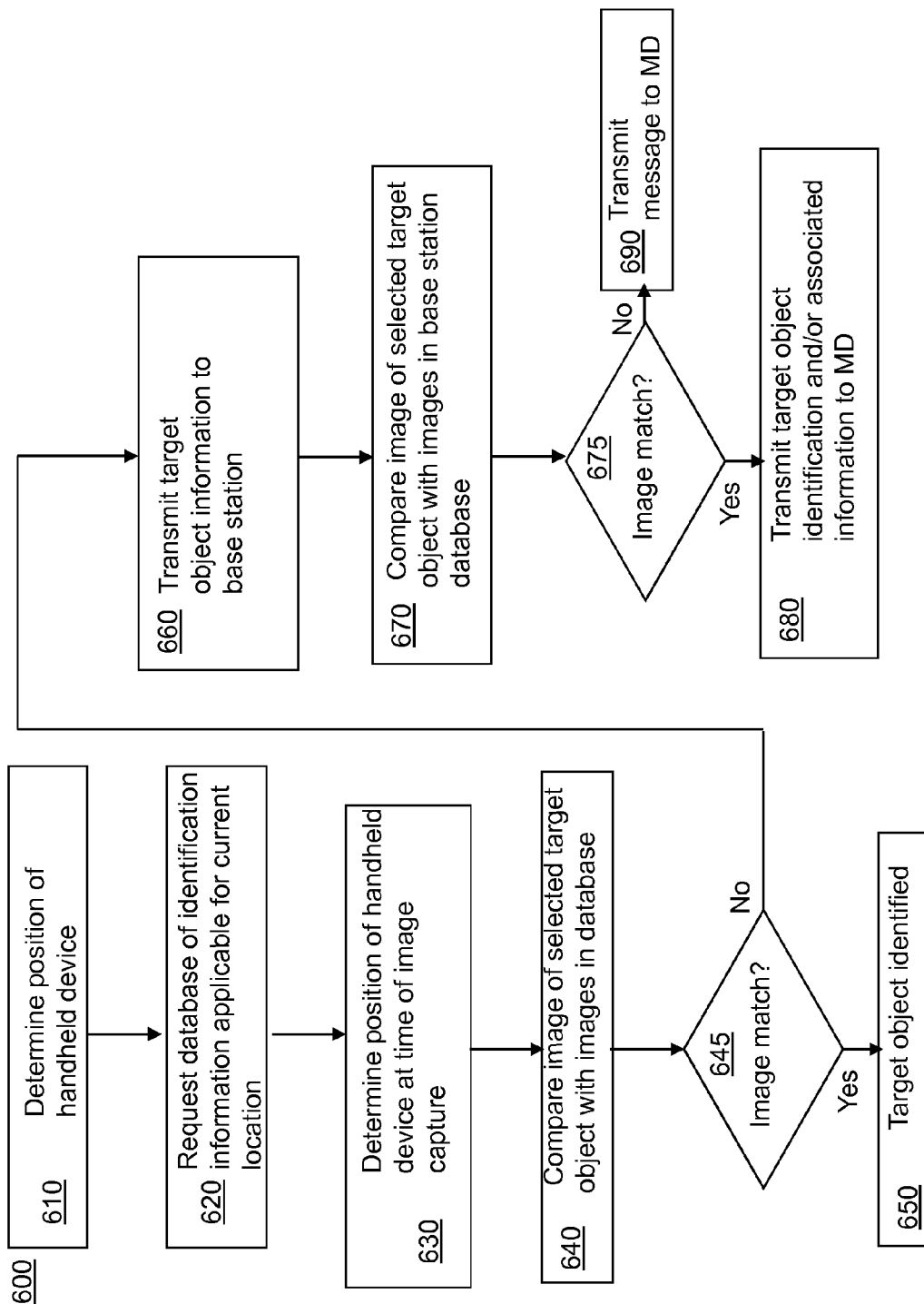
FIG. 6 is a flow diagram illustrating a process for identifying a target object, according to an implementation.

FIG. 6 is a flow diagram of a process 600 for identifying a target object in a captured image, according to an implementation. Such a process may comprise a process performed at block 560 in FIG. 5, for example. In such an implementation, a position of an MD at the time of image capture may be used to narrow a search of candidate target objects during a process of identifying a target object, as described above. At block 610, a position of an MD may be determined using any one of several techniques identified above, for example. Such a position determination may be approximate. For example, for process 600, determining a city, county, and/or region where an MD is located may be sufficient. Alternatively, a user may manually provide a location of an MD, such as by entering a location via a touch-screen, keypad, or the like. In a particular implementation, a target object that includes an image of text (e.g., a photograph that includes a sign) may be identified using one or more techniques that involve text recognition. Such resolved text may comprise a visual attribute that may be used to organize database information associated with a target object, as described above.

At block 620, an MD may request a database of identification information from a base station or other such land-based entity such as an image database server based, at least in part, on such a position determination and/or user input. Such a database may include information regarding target objects in a region surrounding a current location of the MD. In one implementation, as mentioned above, such information may be produced and/or maintained by a service that determines which objects may be of interest to users that subscribe to such a service. For example, a user arriving in New York City may carry an MD that may download information regarding target objects within a one kilometer radius of the MD. The size of such a radius may depend on the number of target objects within such a radius and/or memory capacity of the MD, though claimed subject matter is not so limited. For example, a radius of one kilometer in New York City may include the same number of target objects (e.g., objects of interest that have been recorded into a database) as a radius of one hundred kilometers in a desert region of Arizona. An MD may store such information of a current MD location to be used for target object identification. Identification information may comprise image information to be used for an image recognition process that may be performed by an MD to identify a selected target object. For example, such information may comprise images of landmarks, buildings, statues, signs, and/or electronic devices, for example, which are located near an MD, accordingly to a position determination. In one particular implementation, an MD may request such information from time to time, periodically, consequent to a substantial change in location of the MD (e.g., arriving at an airport), and/or consequent to capturing an image. Accordingly, such an MD may continually store such information regarding the MD's present location and may purge outdated information regarding a region where the MD is no longer located. Such a memory update/purge process may accommodate a limited memory size of an MD, for example.

At block 630, though a position of an MD may have been determined earlier, as at block 610, the MD may again perform a determination of its position consequent to capturing an image (taking a photo) with the MD. If, however, an MD already contains sufficiently current location information acquired from a recent position determination, then block 630 may be skipped. In another embodiment, the image database may be located at an image database server located on a network. In such an embodiment, resolution of an image may be done remotely at the image database server, for example.

At block 640, features of an image of a selected target object may be compared with features of one or more images stored in a memory of an MD during an image recognition process. At block 645, if a matching image is found, then a target object may be identified. For example, a selected target object may comprise an image of the Statue of Liberty. One or more features of such an image may be compared to a database of features of multiple stored images of landmarks and other objects in a region of New York City. If an image of a selected target object matches an image of a known entity (Statue of Liberty in the present example), then the selected target object may be identified, and such a database may provide information regarding the target object. On the other hand, if no match is found, the process 600 may proceed to block 660, where a larger database may be accessed. In a particular implementation, an MD may transmit an image of a selected target object to a land-based station or other entity remote from the MD, and request that an image recognition process be performed at such a land-based station. Of course, such a larger database of image information may be located at another mobile device, and claimed subject matter is not limited to a land-based entity.

At block 670, features of an image of a selected target object may be compared with features of one or more images stored in a image keyed database during an image recognition process. At block 675, if a matching image is found, then a target object may be identified. Accordingly, an image keyed database may transmit information associated with the identified target object to an MD. As discussed above, such information may include details regarding an ability of an associated target device to communicate according to one or more communication protocols, if any, associated with a target device. On the other hand, if no match is found, at block 690, an image-keyed database may transmit a message to an MD indicating that a target identification process was not successful. Of course, such details of an identification process are merely examples, and claimed subject matter is not so limited.

Figure 7:
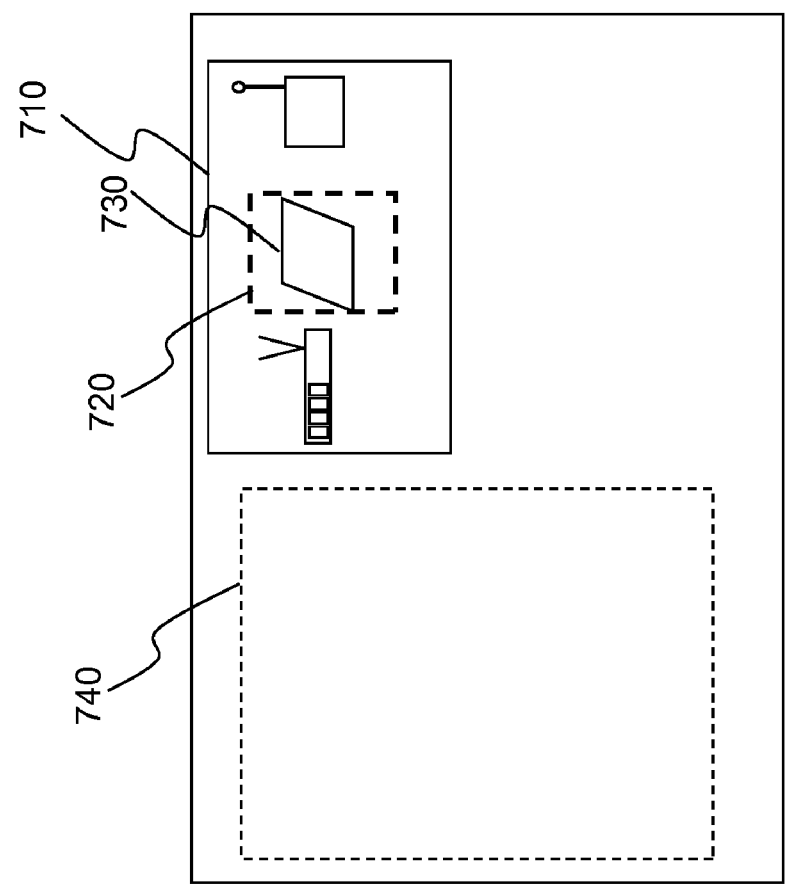
FIG. 7 is a schematic diagram representing a display, according to an implementation.

FIG. 7 is a schematic diagram representing a display 700, according to an implementation. An MD may comprise such a display, which may include a thumbnail 710 of a captured image, graphics 720 to indicate a selected target object 730, and/or a window 740 to display information regarding selected target object 730. Such a thumbnail 710, comprising a reduced-size version of a captured image, may occupy less display area compared to a full-size captured image, thus allowing display 700 to include area for displaying window 740. In such a fashion, a display may provide a user with information regarding a target object displayed as text in window 740 while displaying selected target object 730. Of course, such a display is merely an example, and claimed subject matter is not so limited.

Figure 8:
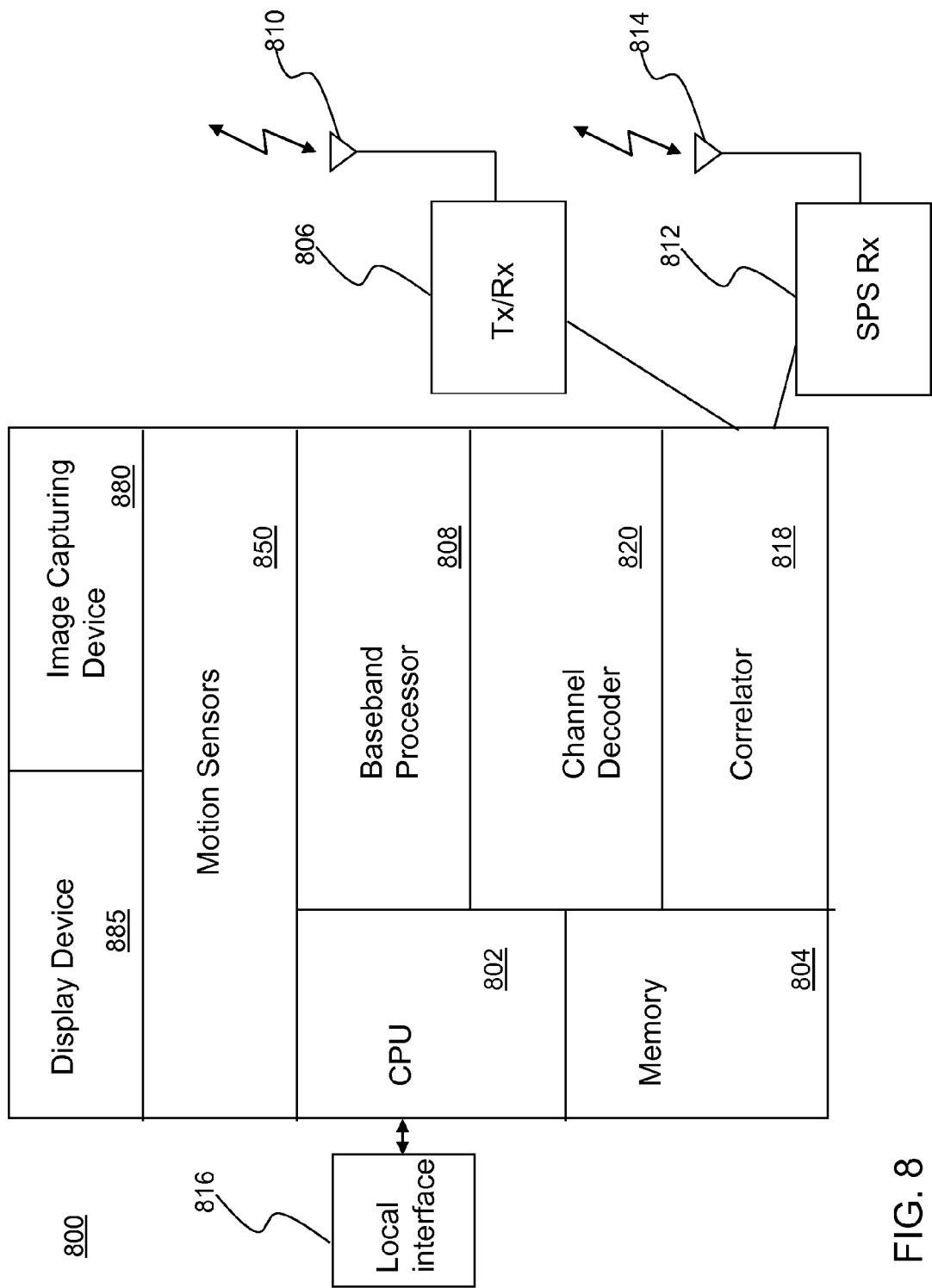
FIG. 8 is a schematic diagram of a mobile device capable of sensing its motion and communicating with a wireless network, according to an implementation.

FIG. 8 is a schematic diagram of a device capable of communication with a wireless network and/or a target object comprising an electronic device, according to one implementation. Such a device may include an image capturing device. In a particular implementation, an MD, such as MD 104 shown in FIG. 1, may comprise a device 800 that is capable of processing SPS signals received at an antenna 814 for determining pseudorange measurements and communicating with a wireless communication network through antenna 810. Here, a radio transceiver 806 may be adapted to modulate an RF carrier signal with baseband information, such as data, voice, and/or SMS messages, onto an RF carrier, and demodulate a modulated RF carrier to obtain such baseband information. Antenna 810 may be adapted to transmit a modulated RF carrier over a wireless communications link and receive a modulated RF carrier over a wireless communications link. Such wireless communications may be used to communicate with a target object comprising an electronic device, for example.

Baseband processor 808 may be adapted to provide baseband information from central processing unit (CPU) 802 to transceiver 806 for transmission over a wireless communications link. Here, CPU 802 may obtain such baseband information from a local interface 816 which may include, for example, environmental sensory data, motion sensor data, altitude data, and/or proximity to other networks (e.g., ZigBee, Bluetooth, WiFi, peer-to-peer). Such baseband information may also include absolute and relative position information such as, for example, an estimate of a location of device 800 and/or information that may be used in computing same such as, for example, pseudorange measurements and/or ES position information as well as distance and bearing information to the object. Such ES position information may also be received from user input, as mentioned above. Channel decoder 820 may be adapted to decode channel symbols received from baseband processor 808 into underlying source bits.

SPS receiver (SPS Rx) 812 may be adapted to receive and process transmissions from SVs, and provide processed information to correlator 818. Correlator 818 may be adapted to derive correlation functions from the information provided by receiver 812.

Memory 804 may be adapted to store machine-readable instructions which are executable to perform one or more of processes, examples, implementations, or examples thereof which have been described or suggested. CPU 802 may be adapted to access and execute such machine-readable instructions. In one implementation, CPU 802 may comprise a special purpose processor or computing device adapted to identify a selected target object and to acquire information regarding the selected target object. Such a special purpose computing device may provide a display environment to allow a user to select one or more particular target objects. For example, CPU 802 may overlay one or more labels on a displayed captured image, and be adapted to receive a selection of a target object based on a user selection of one or more labels corresponding to associated target objects. In another implementation, CPU 802 may be adapted to compare one or more features of a selected target object with one or more features of a plurality of stored images. For example, such a special purpose computing device may be adapted to operate in an RF environment to compare one or more features of a selected target object with one or more features of a plurality of stored images by transmitting an image of the selected target object to a remote location, which may comprise a memory to store such a plurality of stored images. In another implementation, a special purpose computing device may be adapted to operate in an RF environment to determine an approximate position of a mobile device. Such a special purpose computing device may identify the selected target object based at least in part on the determination of the approximate position of the mobile device. However, these are merely examples of tasks that may be performed by a CPU in a particular aspect and claimed subject matter in not limited in these respects. Further, memory 804 may be adapted to store one or more predetermined candidate trajectories, wherein CPU 802 may be adapted to determine a location of device 800 based, at least in part, on a comparison of an estimated trajectory with the one or more predetermined candidate trajectories. In a particular implementation, CPU 802 may be adapted to reduce a number of the one or more predetermined candidate trajectories based at least in part on ES position information.

In an implementation, image capturing device 880 may comprise a camera including a charge coupled device (CCD) array and/or a CMOS array of light sensors, focusing optics, a viewfinder, and/or interfacing electronics to communicate with CPU 802 and memory 804, for example. Display device 885 may comprise a liquid crystal display (LCD) that, in some implementations, may be touch sensitive to provide means for user interaction. Display device 885 may operate as a viewfinder for image capturing device 880, though claimed subject matter is not so limited. Images may be stored in memory 804 so that stored images may be retrieved as a selected target object, as described above.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a special purpose processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

An entity such as a wireless terminal may communicate with a network to request data and other resources. A mobile device (MD), including a cellular telephone, a personal digital assistant (PDA), or a wireless computer are just a few examples of such an entity. Communication of such an entity may include accessing network data, which may tax resources of a communication network, circuitry, or other system hardware. In wireless communication networks, data may be requested and exchanged among entities operating in the network. For example, an MD may request data from a wireless communication network to determine the position of the MD operating within the network: data received from the network may be beneficial or otherwise desired for such a position determination. However, these are merely examples of data exchange between an MD and a network in a particular aspect, and claimed subject matter in not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
capturing an image from a mobile device comprising object images of a plurality of target objects;
displaying said captured image on a display device of said mobile device;
determining an approximate position of said mobile device;
obtaining information on a plurality of objects of interest whose locations are within a radius of the approximate position of the mobile device, wherein the number of objects of interest in the plurality is predefined, and wherein the size of the radius is based at least in part on a distance from the approximate position of said mobile device necessary to encompass the locations of the predefined number of objects;
identifying said plurality of target objects based at least in part on comparing the plurality of target objects to the information on the plurality of objects of interest;
receiving a selection of at least one of said plurality of target objects in said displayed captured image; and
initiating communication with said at least one selected target object responsive to said selection via said mobile device.

2. The method of claim 1, further comprising:
identifying at least one of said target objects; and
acquiring information regarding said at least one identified selected target object.

3. The method of claim 2, further comprising:
displaying said information regarding said at least one identified selected target object in said display device.

4. The method of claim 3, wherein said information comprises a description of a mode of communication supported by said plurality of target objects.

5. The method of claim 2, wherein said information is stored and/or indexed on an image-keyed database located on a communication network including a base station and/or transceiver.

6. The method of claim 1, further comprising:
overlaying one or more labels on said displayed captured image; and
selecting said at least one selected target object based on a selection of said one or more labels.

7. The method of claim 6, wherein said one or more labels respectively overlay said object images of said plurality of target objects.

8. The method of claim 1, further comprising:
displaying an icon in said display device; and
navigating said icon to one of said at least one of said target objects in said displayed captured image to select said one of said at least one of said target objects.

9. The method of claim 1, further comprising:
displaying a selection indicator in said display device to indicate which of said at least one of said target objects in said displayed captured image is currently selected;
toggling a position of said selection indicator among said at least one of said target objects in said displayed captured image; and
selecting one of said at least one of said target objects in said displayed captured image based, at least in part, on said position of said selection indicator.

10. The method of claim 1, further comprising:
resolving said captured image into said plurality of said target objects.

11. The method of claim 1, wherein said determining said approximate position of said mobile device is based, at least in part, on signals comprising Near-Field Communication (NFC) signals, WiFi signals, Bluetooth signals, Ultra-Wideband (UWB) signals, Wide Area Network (WAN) signals, digital TV signals, and/or cell tower ID.

12. The method of claim 1, wherein said determining said approximate position of said mobile device is based, at least in part, on acquisition of one or more satellite positioning system signals at the mobile device.

13. The method of claim 1, wherein said determining said approximate position of said mobile device is based, at least in part, on user input.

14. The method of claim 1, further comprising:
comparing one or more features of said captured image with one or more features of a plurality of stored images.

15. The method of claim 14, wherein said comparing said one or more features of said captured image with one or more features of said plurality of stored images further comprises:
transmitting said captured image to a location comprising a memory that stores said plurality of stored images, wherein said location is remote from said mobile device.

16. The method of claim 1, further comprising:
designating at least one of said target objects to which to communicate based, at least in part, on a visual identification mark, visual indicator, screen pattern, and/or bar code or numerical designator.

17. An apparatus comprising:
means for capturing an image from a mobile device comprising object images of a plurality of target objects;
means for displaying said captured image on a display device of said mobile device;
means for determining an approximate position of said mobile device;
means for obtaining information on a plurality of objects of interest whose locations are within a radius of the approximate position of the mobile device, wherein the number of objects of interest in the plurality is predefined, and wherein the size of the radius is based at least in part on a distance from the approximate position of said mobile device necessary to encompass the locations of the predefined number of objects;
means for identifying said plurality of target objects based at least in part on comparing the plurality of target objects to the information on the plurality of objects of interest;
means for receiving a selection of at least one of said plurality of target objects in said displayed captured image; and
means for initiating communication with said at least one selected target object responsive to said selection via said mobile device.

18. The apparatus of claim 17, further comprising:
means for identifying at least one of said target objects; and
means for acquiring information regarding said at least one identified selected target object.

19. The apparatus of claim 18, further comprising:
means for displaying said information regarding said selected target object in said display device.

20. The apparatus of claim 17, further comprising:
means for overlaying one or more labels on said displayed captured image; and
means for selecting said at least one selected target object based on a selection of said one or more labels.

21. The apparatus of claim 20, wherein said one or more labels respectively overlay said object images of said plurality of target objects.

22. The apparatus of claim 17, further comprising:
means for displaying an icon in said display device; and
means for navigating said icon to one of said at least one of said target objects in said displayed captured image to select said one of said at least one of said target objects.

23. The apparatus of claim 17, further comprising:
means for displaying a selection indicator in said display device to indicate which of said at least one of said target objects in said displayed captured image is currently selected;
means for toggling a position of said selection indicator among said at least one of said target objects in said displayed captured image; and
means for selecting one of said at least one of said target objects in said displayed captured image based, at least in part, on said position of said selection indicator.

24. The apparatus of claim 17, further comprising:
means for resolving said captured image into said plurality of said target objects.

25. The apparatus of claim 17, wherein said means for determining said approximate position of said mobile device is based, at least in part, on signals comprising Near-Field Communication (NFC) signals, WiFi signals, Bluetooth signals, Ultra-Wideband (UWB) signals, Wide Area Network (WAN) signals, digital TV signals, and/or cell tower ID.

26. The apparatus of claim 17, wherein said means for determining said approximate position of said mobile device is based, at least in part, on acquisition of one or more satellite positioning system signals at the mobile device.

27. The apparatus of claim 17, wherein said means for determining said approximate position of said mobile device is based, at least in part, on user input.

28. The apparatus of claim 17, further comprising:
means for comparing one or more features of said captured image with one or more features of a plurality of stored images.

29. The apparatus of claim 28, wherein said means for comparing said one or more features of said captured image with one or more features of said plurality of stored images further comprises:
means for transmitting said captured image to a location comprising a memory that stores said plurality of stored images, wherein said location is remote from said mobile device.

30. A mobile device comprising:
an imaging device to capture an image of one or more target objects;
a display device to display said captured image;
a special purpose computing device adapted to:
determine an approximate position of said mobile device;
obtain information on a plurality of objects of interest whose locations are within a radius of the approximate position of the mobile device, wherein the number of objects of interest in the plurality is predefined, and wherein the size of the radius is based at least in part on a distance from the approximate position of said mobile device necessary to encompass the locations of the predefined number of objects;
identify said plurality of target objects based at least in part on comparing the plurality of target objects to the information on the plurality of objects of interest;

a user interface to receive a selection of at least one of said one or more target objects in said displayed captured image; and the special purpose computing device further adapted to initiate communication with said at least one selected target object responsive to said selection via said mobile device.

31. The mobile device of claim 30, wherein said special purpose computing device is further adapted to:

overlay one or more labels on said displayed captured image; and receive said selection of said at least one selected target object based on a selection of said one or more labels.

32. The mobile device of claim 31, wherein said one or more labels respectively overlay corresponding target objects among said one or more target objects.

33. The mobile device of claim 30, wherein said special purpose computing device is further adapted to compare one or more features of said at least one selected target object with one or more features of a plurality of stored images.

34. The mobile device of claim 33, wherein said special purpose computing device is further adapted to operate in an RF environment to compare said one or more features of said selected target object with one or more features of said plurality of stored images by transmitting an image of said selected target object to a location comprising a memory that stores said plurality of stored images, wherein said location is remote from said mobile device.

35. The mobile device of claim 30, wherein said special purpose computing device is further adapted to operate in an RF environment to determine said approximate position of said mobile device based, at least in part, on signals comprising Near-Field Communication (NFC) signals, WiFi signals, Bluetooth signals, Ultra-Wideband (UWB) signals, Wide Area Network (WAN) signals, digital TV signals, and/or cell tower ID.

36. The mobile device of claim 30, wherein said special purpose computing device is further adapted to operate in an RF environment to determine an approximate position of said mobile device based, at least in part, on acquisition of one or more satellite positioning system signals at the mobile device.

37. The mobile device of claim 30, wherein said special purpose computing device is further adapted to operate in an RF environment to determine an approximate position of said handheld mobile device based, at least in part, on user input.

38. A non-transitory article comprising: a storage medium comprising machine-readable instructions stored thereon that, in response to being executed by a special purpose computing device, are adapted to enable said special purpose computing device to:

capture an image from a mobile device comprising object images of a plurality of target objects;

display said captured image on a display device of said mobile device;

determine an approximate position of said mobile device;

obtain information on a plurality of objects of interest whose locations are within a radius of the approximate position of the mobile device, wherein the number of objects of interest in the plurality is predefined, and wherein the size of the radius is based at least in part on a minimum distance from the approximate position of said mobile device necessary to encompass the locations of the predefined number of objects;

identify said plurality of target objects based at least in part on comparing the plurality of target objects to the information on the plurality of objects of interest;

receive a selection of at least one of said plurality of target objects in said displayed captured image; and initiate communication with said at least one selected target object responsive to said selection via said mobile device.

39. The article of claim 38, wherein said machine-readable instructions, in response to being executed by a special purpose computing device, are further adapted to enable said special purpose computing device to:

display information regarding said at least one selected target object in said display device.

40. The article of claim 38, wherein said machine-readable instructions, in response to being executed by a special purpose computing device, are further adapted to enable said special purpose computing device to:

identify at least one of said plurality of target objects; and acquire information regarding said identified at least one target object.

41. The article of claim 38, wherein said machine-readable instructions, in response to being executed by a special purpose computing device, are further adapted to enable said special purpose computing device to:

overlay one or more labels on said displayed captured image; and select said at least one selected target object based on a selection of said one or more labels.

42. The article of claim 41, wherein said one or more labels respectively overlay said object images of said plurality of target objects.

43. The article of claim 38, wherein said machine-readable instructions, in response to being executed by a special purpose computing device, are further adapted to enable said special purpose computing device to:

display an icon in said display device; and navigate said icon to one of said at least one of said target objects in said displayed captured image to select said one of said at least one of said target objects.

44. The article of claim 38, wherein said machine-readable instructions, in response to being executed by a special purpose computing device, are further adapted to enable said special purpose computing device to:

display a selection indicator in said display device to indicate which of said at least one of said target objects in said displayed captured image is currently selected;

toggle a position of said selection indicator among said at least one of said target objects in said displayed captured image; and select one of said at least one of said target objects in said displayed captured image based, at least in part, on said position of said selection indicator.

45. The article of claim 38, wherein said machine-readable instructions, in response to being executed by a special purpose computing device, are further adapted to enable said special purpose computing device to:

resolve said captured image into said plurality of said target objects.

46. The article of claim 38, wherein said determining said approximate position of said mobile device is based, at least in part, on signals comprising Near-Field Communication (NFC) signals, WiFi signals, Bluetooth signals, Ultra-Wideband (UWB) signals, Wide Area Network (WAN) signals, digital TV signals, and/or cell tower ID.

47. The article of claim 38, wherein said determining said approximate position of said mobile device is based, at least in part, on acquisition of one or more satellite positioning system signals at the mobile device.

48. The article of claim 38, wherein said determining said approximate position of said mobile device is based, at least in part, on user input.

49. The article of claim 38, wherein said machine-readable instructions, in response to being executed by a special purpose computing device, are further adapted to enable said special purpose computing device to:
compare one or more features of said captured image with one or more features of a plurality of stored images.

50. The article of claim 49, wherein said machine-readable instructions, in response to being executed by a special purpose computing device, are further adapted to enable said special purpose computing device to:
transmit said captured image to a location comprising a memory that stores said plurality of stored images, wherein said location is remote from said mobile device.

* * * * *